(12) United States Patent
Karacali-Akyamac et al.

(10) Patent No.: US 7,768,929 B2
(45) Date of Patent: Aug. 3, 2010

(54) DETERMINATION OF ENDPOINT DEVICE LOCATION FOR EFFICIENT ANALYSIS OF NETWORK PERFORMANCE

(75) Inventors: Bengi Karacali-Akyamac, Bridgewater, NJ (US); Balaji Rao, Somerville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 894 days.

(21) Appl. No.: 11/496,360

(22) Filed: Jul. 31, 2006

(65) Prior Publication Data

US 2008/0025223 A1   Jan. 31, 2008

(51) Int. Cl.
*G06F 11/07* (2006.01)

(52) U.S. Cl. .................................. 370/242; 370/241
(58) Field of Classification Search ................. 370/242
See application file for complete search history.

(56) References Cited

U.S. PATENT DOCUMENTS

| | | | |
|---|---|---|---|
| 7,031,264 B2 | 4/2006 | Adhikari et al. | |
| 7,408,885 B2 * | 8/2008 | Denby et al. | 370/252 |
| 2002/0167937 A1 * | 11/2002 | Goodman | 370/352 |
| 2003/0086425 A1 | 5/2003 | Bearden et al. | |
| 2003/0091165 A1 | 5/2003 | Bearden et al. | |
| 2003/0097438 A1 | 5/2003 | Bearden et al. | |
| 2004/0062204 A1 | 4/2004 | Bearden et al. | |
| 2004/0186696 A1 * | 9/2004 | Alicherry et al. | 703/1 |
| 2004/0252694 A1 | 12/2004 | Adhikari et al. | |
| 2005/0053009 A1 | 3/2005 | Denby et al. | |
| 2005/0207410 A1 | 9/2005 | Adhikari et al. | |

OTHER PUBLICATIONS

U.S. Appl. No. 11/536,229, filed Sep. 28, 2006, A. Adhikari et al., "Root Cause Analysis of Network Performance Based on Exculpation or Inculpation Sets."
U.S. Appl. No. 11/531,910, filed Sep. 14, 2006, L. Denby et al., "Data Compression in a Distributed Monitoring System."
B. Karacali et al., "Scalable Network Assessment for IP Telephony," Proceedings of the 2004 IEEE International Conference on Communications (ICC-04), pp. 1-14, 2004.

(Continued)

*Primary Examiner*—Huy D Vu
*Assistant Examiner*—Stephen J Clawson
(74) *Attorney, Agent, or Firm*—Joseph B. Ryan; Jason Paul DeMont; Wayne S. Breyer

(57) ABSTRACT

A network monitoring and analysis system is configured to conduct performance analysis on a network using a plurality of endpoint devices. Locations of respective endpoint devices for use in the performance analysis of the network are determined utilizing an algorithm which characterizes the network as a graph having edges and vertices and associates endpoint devices with particular ones of the vertices in an iterative manner based on impact of said vertices on achievement of a specified coverage criterion. The coverage criterion may comprise a links-covered criterion which specifies a percentage of a total number of links of the network that are covered by test communications. As another example, the coverage criterion may comprise a links-estimable criterion which specifies a percentage of a total number of links of the network for which performance is estimable from collected end-to-end path measurement data.

15 Claims, 5 Drawing Sheets

OTHER PUBLICATIONS

"Avaya ExpertNet™ Lite Assessment Tool," White Paper, 10 pages, Apr. 2005.

"Avaya ExpertNet™ VoIP Assessment Tool," White Paper, 13 pages, Sep. 2005.

C. Tang et al., "On the Cost-Quality Tradeoff in Topology-Aware Overlay Path Probing," Proceedings of the 11th IEEE Conference on Network Protocols (ICNP), 12 pages, Nov. 2003.

R. Kumar et al., "Efficient Beacon Placement for Network Tomography," IMC '04, Proceedings of the 4th ACM SIGCOMM Conference on Internet Measurement, ACM Press, 6 pages, Oct. 2004.

Y. Chen et al., "An Algebraic Approach to Practical and Scalable Overlay Network Monitoring," SIGCOMM '04, Proceedings of the 2004 Conference on Applications, Technologies, Architectures, and Protocols for Computer Communications, ACM Press, pp. 1-12, Aug.-Sep. 2004.

Y. Shavitt et al., "Computing the Unmeasured: An Algebraic Approach to Internet Mapping," IEEE Journal on Selected Areas in Communications, vol. 22, No. 1, pp. 67-78, Jan. 2004.

J.D. Horton et al., "On the Number of Distributed Measurement Points for Network Tomography," IMC '03, Proceedings of the 3rd ACM SIGCOMM Conference on Internet Measurement, ACM Press, 6 pages, Oct. 2003.

S. Jamin et al., "On the Placement of Internet Instrumentation," Proceedings of the IEEE Infocom 2000, 10 pages, 2000.

Moshe Sidi, "Reality-based VoIP Readiness Testing using NetAlly® VoIP," Viola Networks, pp. 1-10, Apr. 2002.

Moshe Sidi, "Readying Your Network for VoIP: Get it Right the First Time," Viola Networks, pp. 1-9, Apr. 2002.

J.Q. Walker, "A Handbook for Successful VoIP Deployment: Network Testing, QoS, and More," NetIQ Corporation, pp. 1-13, 2002.

Y. Breitbart et al., "Topology Discovery in Heterogeneous IP Networks," Proceedings of IEEE Infocom 2000, 10 pages, Mar. 2000.

B. Huffaker et al., "Topology Discovery by Active Probing," CAIDA, 8 pages, 2002.

M.R. Meiss et al., "Standards-Based Discovery of Switched Ethernet Topology," Advanced Network Management Lab, pp. 1-20, Apr. 2002.

R. Siamwalla et al., "Discovering Internet Topology," Cornell University, pp. 1-16, Jul. 1998.

C. Perkins et al., "RTP Testing Strategies," Network Working Group, RFC 3158, pp. 1-21, Aug. 2001.

\* cited by examiner

|    | R1    | R2    | R3    | R4    | R5 |
|----|-------|-------|-------|-------|----|
| R1 |       | l1.l2 | l1.l3 | l1.l4 | l1 |
| R2 | l1.l2 |       | l2.l3 | l2.l4 | l2 |
| R3 | l1.l3 | l2.l3 |       | l5    | l3 |
| R4 | l1.l4 | l2.l4 | l5    |       | l4 |
| R5 | l1    | l2    | l3    | l4    |    |

|         | l1 | l2 | l3 |
|---------|----|----|----|
| R1 − R2 | 1  | 1  | 0  |
| R1 − R3 | 1  | 0  | 1  |
| R2 − R3 | 0  | 1  | 1  |

|         | l1 | l2 | l3 | l4 | l5 |
|---------|----|----|----|----|----|
| R1 − R2 | 1  | 1  | 0  | 0  | 0  |
| R1 − R3 | 1  | 0  | 1  | 0  | 0  |
| R2 − R3 | 0  | 1  | 1  | 0  | 0  |
| R1 − R4 | 1  | 0  | 0  | 1  | 0  |
| R3 − R4 | 0  | 0  | 0  | 0  | 1  |

FIG. 4

```
Generic_Algorithm(G: Graph, R: Routes, C: Criterion)
D = ∅                       // Set of network devices to attach endpoints
while C is not satisfied
    Find v with the highest score in V\D wrt to C
    Add v to D
    Update the scores of vertices in V\D
return D
```

FIG. 5

```
LC_Algorithm(G: Graph, R: Routes, C: Criterion)
R' ← R                      // R' maintains paths that have uncovered parts
D = ∅                       // Set of network devices to attach endpoints
while C is not satisfied
    Find v in V\D with the maximum score where:
        score_LC(v) = # of uncovered edges on the paths between v and vertices in D
    Add v to D
    Remove from R' all paths between v and vertices in D
return D
```

FIG. 6

```
LE_Algorithm(G: Graph, R: Routes, C: Criterion)

D = ∅                          // Set of network devices to attach endpoints
create a forest, F, that represents routes in R over G
while C is not satisfied
  Find v in V\D with the maximum score where:
    score_LE(v) = Rank of v after sorting V\D in reverse by
    (i) the number of trees of F v appears on
    (ii) the maximum degree of v in F
  Add v to D
  for each tree T in F that v appears on
    if v is not in T, do nothing
    else if v is in T as a leaf, do nothing
    else                       // v is a non-leaf node in T
      Remove T from F
      Break T at v into degree(v) trees, add the new trees to F
return D
```

US 7,768,929 B2

DETERMINATION OF ENDPOINT DEVICE LOCATION FOR EFFICIENT ANALYSIS OF NETWORK PERFORMANCE

FIELD OF THE INVENTION

The invention relates generally to network monitoring and analysis systems, and more particularly to techniques for the monitoring and analysis of Voice over Internet Protocol (VoIP) communications, multimedia communications or other types of network traffic.

BACKGROUND OF THE INVENTION

Recent trends in the telecommunications industry towards unified communications emphasize the need for converged networks to deliver acceptable quality of service (QoS) for different types of applications with varying QoS needs. Multimedia applications such as Internet telephony are among the end-to-end applications which demand strict QoS guarantees from the underlying data network. Understanding the network behavior at all stages of the deployment of such applications is critical for their performance. For example, at the pre-deployment stage, it is necessary to assess whether the network can deliver the required QoS and more importantly which parts of the network fail to do so. After deployment, monitoring the performance of the network is necessary for maintaining acceptable QoS levels.

Conventional network monitoring and analysis systems are generally not configured to provide an adequate mechanism for understanding link-level QoS behavior in a network. Such information is particularly useful for the purpose of locating the sources of performance problems in a network, but is also useful for many other purposes.

U.S. Patent Application Publication No. 2005/0053009, entitled "Method and Apparatus for Automatic Determination of Performance Problem Locations in a Network," discloses techniques for automatically determining the particular locations associated with performance problems in a network comprising a plurality of endpoint devices. In one aspect, a network monitoring and analysis system is configured to include a root cause analysis function that permits the automatic determination of performance problem locations in the network. Test communications are generated in accordance with a selected pattern, and end-to-end path measurement data is collected utilizing the generated test communications. The test communications may be directed between pairs of the endpoint devices as specified in the selected pattern. The end-to-end path measurement data is transformed to produce performance indicators for respective non-end-to-end paths defined at least in part by the selected pattern. Such an approach advantageously provides a particularly efficient and accurate mechanism for generating link-level performance indicators in a network, thereby permitting a better understanding of QoS behavior in the network.

Despite the considerable advances provided by the techniques disclosed in the above-cited U.S. patent application, a need remains for further improvements, particularly with regard to the manner in which the endpoint devices used to generate the end-to-end measurements are distributed within the network. Even though the endpoint devices individually are typically not very expensive and not too difficult to deploy, they constitute a limited resource that should be dispensed carefully. Different placement strategies that use the same number of devices may result in varying network coverage. For instance, poor placement strategies may result in situations where no synthetic traffic traverses parts of the network while other parts are excessively probed. Furthermore, link level inference used in the root cause analysis in an illustrative embodiment described in the above-cited U.S. patent application depends on the location of the endpoint devices and the network paths exercised by the traffic injected from the endpoint devices. Poor choice of device locations may undermine the analysis. Hence there is a need for a systematic approach to intelligently place these endpoint devices in the network. Also, it would be desirable to have a technique for accurately estimating the number of endpoint devices that may be required in those implementations in which network topology information is not readily available.

SUMMARY OF THE INVENTION

The present invention in one or more illustrative embodiments provides techniques for locating endpoint devices within a network so as to facilitate root cause analysis or other types of network performance analysis.

In one aspect of the invention, locations of respective endpoint devices for use in the performance analysis of a network are determined utilizing an algorithm which characterizes the network as a graph having edges and vertices and associates endpoint devices with particular ones of the vertices in an iterative manner based on impact of said vertices on achievement of a specified coverage criterion. The vertices may correspond, for example, to routers or other switching elements of the network and the edges may correspond, for example, to IP layer connectivity between the switching elements of the network, although it is to be appreciated that the disclosed techniques are readily applicable to other types of network connectivity, such as layer-2 connectivity. Test communications are generated between respective pairs of the determined endpoint devices, end-to-end path measurement data is collected utilizing the generated test communications, and the end-to-end path measurement data is transformed to produce a plurality of performance indicators.

The coverage criterion may comprise a links-covered criterion which specifies a percentage of a total number of links of the network that are covered by the test communications. As another example, the coverage criterion may comprise a links-estimable criterion which specifies a percentage of a total number of links of the network for which performance is estimable from the collected end-to-end path measurement data.

In an illustrative embodiment, the endpoint location determination algorithm in a given iteration selects one or more of the vertices of the graph for association with one or more respective endpoint devices based on scores computed for the vertices. After selection of the one or more vertices in the given iteration, scores of the remaining vertices are recomputed for use in a subsequent iteration of the algorithm.

In a links-covered version of the algorithm, the score computed for a given one of the vertices is given by a number of uncovered edges on paths between the given vertex and vertices already selected for association with respective endpoint devices.

In a links-estimable version of the algorithm, the graph comprises a plurality of trees defined by the edges and vertices, with the leaf nodes of the trees being associated with respective ones of the endpoint devices. The score computed for a given one of the vertices is given by a rank of the given vertex after sorting unselected vertices based on a number of trees in which the vertices appear and degree of the vertices. If a selected one of the vertices comprises a non-leaf node of a tree of the graph, the tree is broken at the selected vertex into a number of separate trees, the number corresponding to the degree of the node.

Advantageously, the present invention in the illustrative embodiments provides efficient techniques for determining an appropriate placement of endpoint devices in a network, thereby facilitating the generation of link-level performance indicators and the maintenance of acceptable QoS levels in the network.

BRIEF DESCRIPTION OF THE DRAWINGS

FIG. 4 shows a generic greedy algorithm for selecting endpoint locations such that a given criteria is satisfied.

FIGS. 5 and 6 show respective links-covered (LC) and links-estimable (LE) algorithms for selecting endpoint locations.

DETAILED DESCRIPTION OF THE INVENTION

The invention will be illustrated below in conjunction with an exemplary network-based communication system suitable for supporting Internet telephony applications. It should be understood, however, that the invention is not limited to use with any particular type of communication system or configuration of endpoint devices or other system elements. Those skilled in the art will recognize that the disclosed techniques may be used in any communication application in which it is desirable to provide improved monitoring and/or analysis of Internet protocol (IP) communications or other types of real-time or non-real-time network traffic.

Moreover, the invention, although particularly well-suited for use in monitoring and analysis of VoIP traffic, also provides significant advantages in multimedia traffic applications or other flow-based real-time applications in which it is desirable to understand link-level performance within the network.

The invention can thus be used with voice, video, multimedia or any other type of network traffic.

The term "packet" as used herein is intended to include not only IP packets but also other types of packets used in other packet-based communication systems.

The term "call" as used herein is intended to be construed broadly so as to encompass Internet telephony communications, VoIP communications, Session Initiation Protocol (SIP) communications, multimedia communications, or other types of network traffic.

The terms "endpoint" and "endpoint device" are used interchangeably herein and are intended to include an origination or destination device associated with a given VoIP call or other type of communication. Examples of such devices may also be referred to herein as monitoring devices, measurement devices, software agents, etc.

It is to be appreciated that a given endpoint device therefore need not be a terminal device of the system, and may comprise an internal network element such as, for example, a gateway, a router, a switch, or any other type of non-terminal network element. A given pair of endpoint devices in the illustrative embodiment may be viewed generally as comprising the source and destination nodes of a particular communication path. An endpoint device may therefore be a device comprising or otherwise associated with any network node.

The term "measurement data" as used herein is intended to include, for example, jitter, loss, delay or other QoS-related statistics, associated analysis results determinable therefrom, as well as other types of data.

Figure 1A:
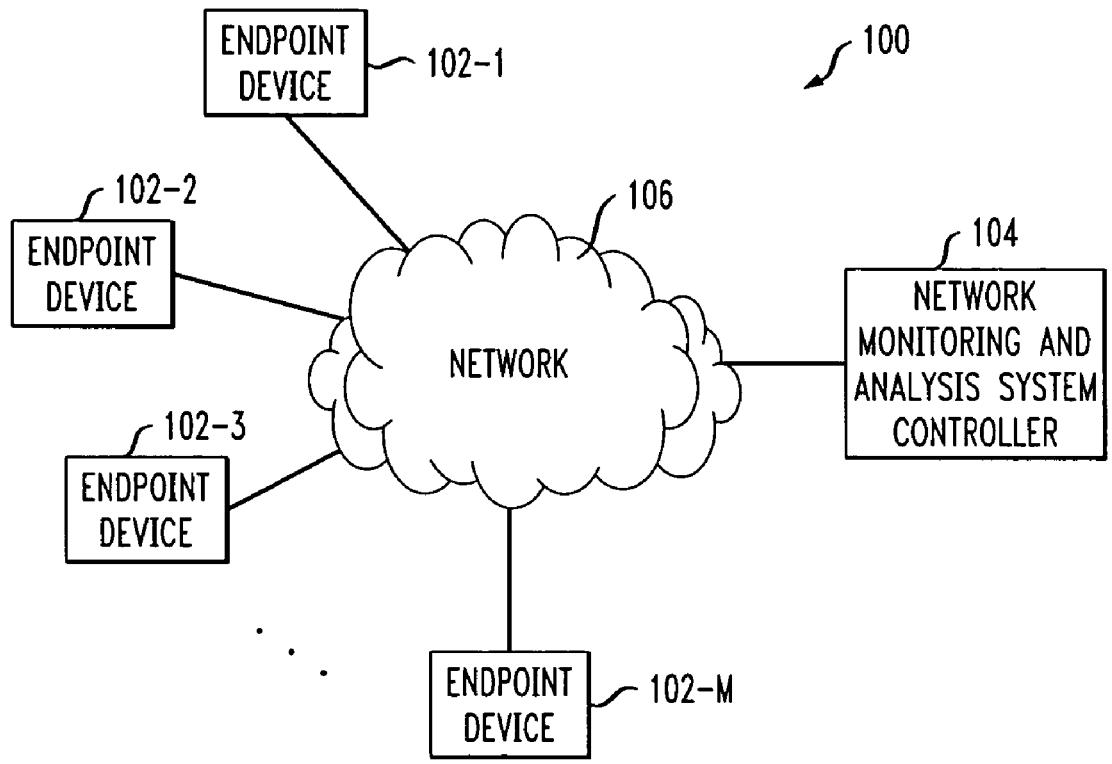
FIG. 1A shows an exemplary communication system in which the invention is implemented.

FIG. 1A shows an example network-based communication system 100 in which the present invention is implemented. The system 100 includes an arbitrary number M of endpoint devices 102-j, j=1, 2, . . . M, and a network monitoring and analysis system controller 104. Each of the endpoint devices 102 and the controller 104 is coupled to or otherwise associated with a network 106. It should be noted that the variable j is used in a different sense in the context of FIG. 1A than elsewhere in the description.

Although shown for simplicity of illustration as terminal endpoint devices in the figure, one or more of the endpoint devices of the system, as indicated previously, may comprise or be otherwise associated with an internal node of network 106.

An illustrative embodiment of the invention as implemented in the network-based communication system 100 of FIG. 1A advantageously permits automated determination of the particular location(s) associated with one or more performance problems in the network 106, as described in the above-cited U.S. Patent Application Publication No. 2005/0053009. This function is generally referred to herein as "root cause analysis," and is a type of function that may also be referred to as "blame attribution." The controller 104 may illustratively comprise an otherwise conventional controller of a network monitoring and analysis system, implemented in or otherwise utilized in conjunction with the system 100, suitably modified to include a root cause analysis function, as will be described in detail below.

The term "network monitoring and analysis system" as used herein is intended to include a network monitoring system, a network analysis system, or a system capable of both network monitoring and network analysis.

One example of a network monitoring and analysis system that may be configured to include a root cause analysis function in accordance with the invention is the ExpertNet™ network readiness assessment tool from Avaya Inc. of Basking Ridge, N.J., USA. The ExpertNet™ tool may be configured to collect various measurements from a network, including, by way of example, topology information, periodic traffic measurements from network devices via Simple Network Management Protocol (SNMP), and end-to-end performance measurements collected with the use of software agents installed at various endpoint devices or elsewhere in the network. The conventional aspects of this tool and other network monitoring and analysis systems are well-known in the art, and therefore will not be further described herein. Such systems may be implemented at least in part in the form of software running on a computer or other processing device associated with the controller 104.

Further aspects of network monitoring and analysis systems that may be utilized in conjunction with the invention are described in, for example, U.S. patent application Ser. No. 10/270,011, entitled "Report Generation and Visualization Systems and Methods and Their Use in Testing Frameworks for Determining Suitability of a Network for Target Applications," U.S. patent application Ser. No. 10/270,335, entitled "Network Topology Discovery Systems and Methods and Their Use in Testing Frameworks for Determining Suitability of a Network for Target Applications," and U.S. patent application Ser. No. 10/270,122, entitled "Network Traffic Generation and Monitoring Systems and Methods for Their Use in Testing Frameworks for Determining Suitability of a Network for Target Applications," all filed on Oct. 15, 2002, the disclosures of which are incorporated by reference herein.

Additional details regarding possible network monitoring and analysis system features that may be implemented in the system 100 are described in U.S. patent application Ser. No. 10/261,431, filed Sep. 30, 2002 and entitled "Communication System Endpoint Device With Integrated Call Synthesis Capability," U.S. Pat. No. 7,031,264, issued Apr. 18, 2006 and entitled "Distributed Monitoring and Analysis System for Network Traffic," and U.S. patent application Ser. No. 10/460,700, filed Jun. 12, 2003 and entitled "Method and Apparatus for Determination of Network Topology," the disclosures of which are incorporated by reference herein.

Although system 100 is shown as including a centralized controller 104 in FIG. 1A, this should not be construed as a requirement of the invention. The invention can alternatively be implemented using a distributed monitoring and analysis system as described in the above-cited U.S. Pat. No. 7,031, 264, or using a combination of centralized and distributed techniques. In such embodiments, the functions of the controller 104 may be distributed at least in part across one or more of the endpoint devices, and/or associated distributed test units.

The term "controller" as used herein is therefore intended to include a centralized controller, a distributed controller, or a hybrid controller which is at least partially centralized and at least partially distributed.

The endpoint devices 102 may be otherwise conventional wired or wireless IP telephones (including devices commonly referred to as IP "softphones"), personal digital assistants (PDAs), mobile telephones, personal computers (PCs), single-board computers (SBCs) or other types of processing devices, suitably configured for interaction with the controller 104 in providing various functions of the network monitoring and analysis system.

It should be noted that the endpoint devices 102 are each typically configured to operate as both receiver and transmitter, as in the case of a bidirectional VoIP communication established between a given pair of endpoints.

Conventional aspects of such endpoint devices are well-known in the art and therefore not described in further detail herein.

One or more of the endpoint devices 102 may comprise so-called "synthetic" devices which generate test communications in the form of synthesized calls but are not configured for use in placing actual calls. Also, one or more of the endpoint devices may comprise devices suitable for use in placing actual calls and also capable of generating test communications in the form of synthesized calls. Additional details regarding devices of the latter type can be found in the above-cited U.S. patent application Ser. No. 10/261,431.

Additional system elements, not shown in FIG. 1A, may be coupled between each of the endpoints 102 and the network 106, or otherwise arranged within the system 100, in accordance with conventional practice.

Network 106 may represent, e.g., a global communication network such as the Internet, a wide area network, a metropolitan area network, a local area network, a wireless cellular network, a public switched telephone network (PSTN), or a satellite network, as well as portions or combinations of these or other communication networks.

The network 106 may comprise conventional IP routers, gateways, switches or other packet processing elements. For example, the network may include a DEFINITY® Enterprise Communication Service (ECS) communication system switch available from Avaya Inc. of Basking Ridge, N.J., USA. Another example call processing switch suitable for use in conjunction with the present invention is the MultiVantage™ communication system switch, also available from Avaya Inc.

Standard protocols that are commonly utilized in VoIP communications include User Datagram Protocol (UDP), described in Internet Engineering Task Force (IETF) Request for Comments (RFC) 768, "User Datagram Protocol," August 1980, http://www.ietf.org/rfc/rfc768.txt, Real-Time Transport Protocol (RTP), described in IETF RFC 1889, "RTP: A Transport Protocol for Real-Time Applications," http://www.ietf.org/rfc/rfc1889.txt, and RTP Control Protocol (RTCP), described in IETF RFC 3158, "RTP Testing Strategies," August 2001, all of which are hereby incorporated by reference herein.

By way of example, VoIP communications may comprise RTP voice data packets that are sent over an IP network using UDP. More particularly, the RTP packets are encapsulated in UDP packets which are themselves encapsulated in IP packets. Of course, a wide variety of protocols and encapsulation arrangements may be used in implementing the invention.

Signaling protocols utilizable in conjunction with VoIP communications to provide functions such as call setup, teardown and dial tone include Session Initiation Protocol (SIP), described in IETF RFC 3261, "SIP: Session Initiation Protocol," June 2002, http://www.ietf.org/rfc/rfc3261.txt, International Telecommunication Union-Telecommunication Standardization Sector (ITU-T) Recommendation H.323, "Packet-based multimedia communication systems," November 2000, and ITU-T Recommendation H.225, "Call signaling protocols and media stream packetization for packet-based multimedia communication systems," November 2000, all of which are incorporated by reference herein.

VoIP communications or other communications in the context of the present invention may be implemented utilizing one or more of the above-cited protocols, or other suitable protocols, as will be readily apparent to those skilled in the art.

It should be emphasized that the simplified configuration of the system 100 as shown in FIG. 1A is for purposes of illustration only, and should not be construed as limiting the invention to any particular arrangement of elements. For example, the system 100 may include additional endpoints, comprising other types and arrangements of routing elements, switching elements or other types of processing elements.

Figure 1B:
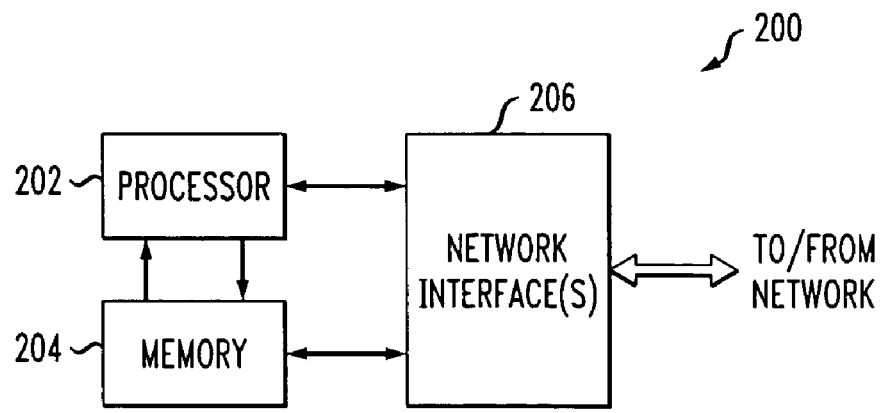
FIG. 1B is a simplified block diagram showing one possible implementation of an endpoint device, controller or other processing element of the FIG. 1A system.

FIG. 1B shows one possible implementation of a given processing element 200 of the FIG. 1A system. The processing element 200 may represent, by way of example, at least a portion of a given one of the endpoint devices 102, at least a portion of the controller 104, or at least a portion of another processing device of the system.

The processing element 200 as shown in the figure includes a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as combinations thereof.

Those skilled in the art will recognize that the individual elements of FIG. 1B as shown for illustrative purposes may be combined into or distributed across one or more processing devices, e.g., a microprocessor, an application-specific integrated circuit (ASIC), a computer or other device(s).

The FIG. 1B arrangement is considerably simplified for purposes of illustration. For example, if viewed as representative of a telephony terminal endpoint device, the processing element 200 may include conventional elements typically associated with such a device, such as codecs and other voice signal processing hardware or software elements.

As indicated above, the illustrative embodiment of the invention as implemented in the network-based communication system 100 of FIG. 1A utilizes endpoints 102 and controller 104 to provide a root cause analysis function in a network monitoring and analysis system. The root cause analysis function will be briefly described with reference to FIGS. 2A and 2B. Additional details of the associated processing operations can be found in the above-cited U.S. Patent Application Publication No. 2005/0053009.

Techniques for determining appropriate locations for the particular endpoint devices that are utilized in a given instance of the root cause analysis function will be described with reference to FIGS. 3 through 6.

Figure 2A:
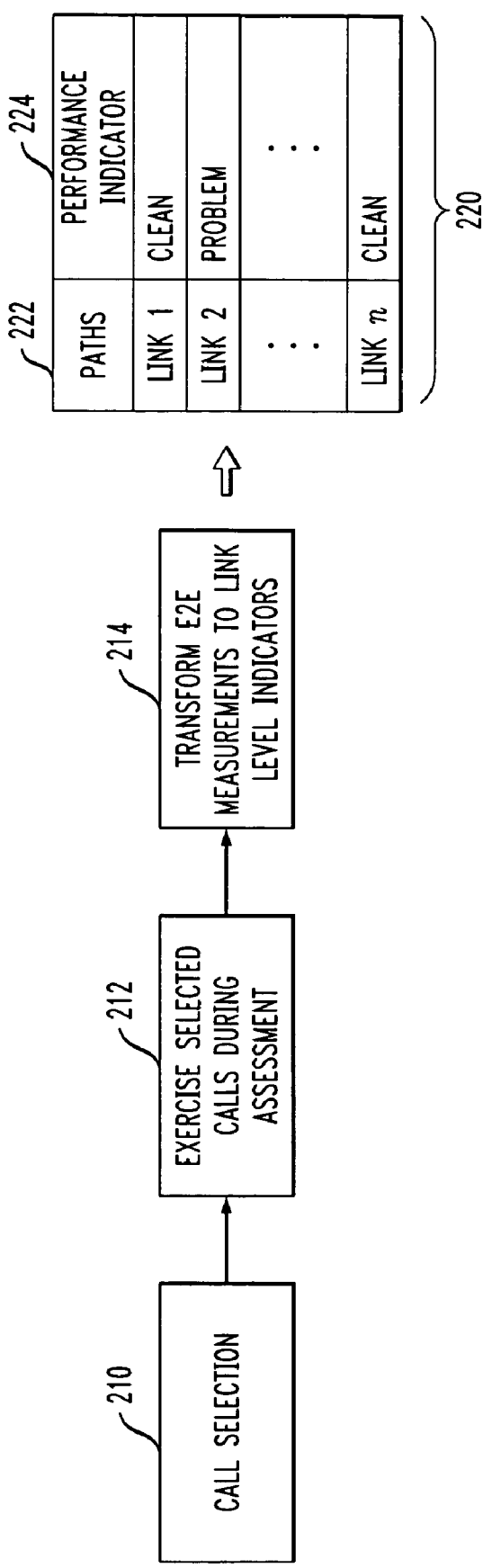
FIGS. 2A and 2B illustrate a root cause analysis function implemented in the system of FIG. 1A in accordance with an illustrative embodiment of the invention.

Referring initially to FIG. 2A, a root cause analysis function in the illustrative embodiment includes a call selection step 210, an assessment step 212, and a transformation step 214, and produces output information 220 that identifies the particular location(s) associated with one or more performance problems in the network 106.

Selection step 210 involves selection of an appropriate set of calls to be placed in the system 100 in conjunction with the root cause analysis function. The selected set of calls is an example of what is more generally referred to herein as a "selected call pattern," or even more generally as a "selected pattern."

In step 212, the selected calls are placed, or "exercised," as part of a network assessment operation of the network monitoring and analysis system, with each call generally being placed between a corresponding pair of endpoint devices 102 of the system 100. As indicated above, techniques for determining an appropriate set of endpoint device locations will be described below in conjunction with FIGS. 3 through 6.

The resulting end-to-end (E2E) measurements, comprising measurement data characterizing the selected calls, are then transformed to link-level indicators in step 214.

The root cause analysis function in the illustrative embodiment yields the output information 220, which includes a set of paths 222 and a corresponding set of performance indicators 224. The set of paths 222 includes an identifier for each of n links, denoted Link 1, Link 2, . . . Link n. The set of performance indicators 224 includes, for each of the links, a corresponding performance indicator. In this example, the performance indicators are binary in nature, taking on one of two values, namely, "Clean" to indicate a link that is not associated with a performance problem, and "Problem" to indicate a link that is associated with a performance problem. More specifically, Link 2 is shown as having the "Problem" indicator, and is thus associated with a performance problem, while Link 1 and Link n are each denoted as "Clean." The indicators may be determined based on a user-defined threshold of acceptable performance, or using other types of thresholding arrangements. The particular thresholds used in a given implementation of the invention are generally dependent upon the application, and can be determined in a straightforward manner, as will be readily apparent to those skilled in the art.

It is to be appreciated that the particular arrangement of processing steps and the output information configuration of FIG. 2A is presented by way of illustrative example only. Numerous alternative arrangements of processing steps and output information configuration may be used in implementing the invention, and the invention is not limited in this regard.

Figure 2B:
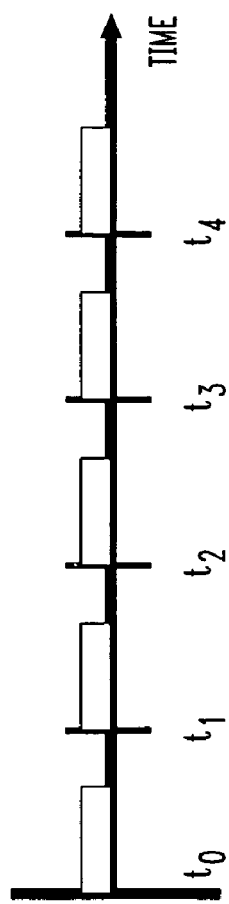

The root cause analysis function described in conjunction with FIG. 2A involves injecting calls at each of a plurality of times $t_i$, i=1, 2, . . . , with the times preferably being arranged substantially as indicated in FIG. 2B, collecting end-to-end path measurements, and transforming the end-to-end path measurements so as to assign performance indicators to each estimable link.

The end-to-end path measurements are collected from the network under consideration at regular time intervals and then the measurements are used to infer link-level performance estimates at each time interval. Measurement collection is implemented by injecting synthetic traffic between endpoints in the network. Note that the time interval length is an adjustable parameter that depends on how frequently one would like to sample the network.

At each time interval, the collected measurements may be viewed as forming the following linear equation:

$$y=Ax$$

where y is a vector of measurements, such as delay, collected on end-to-end paths, A is a flow matrix, and x is a vector of network link-level performance metrics. The rows of A correspond to end-to-end measurement paths and the columns of A to network paths or segments. Each entry $a_{i,j}$ of the flow matrix A represents the number of times the end-to-end measurement path of row i traverses the path of column j.

In order to determine the x values at each time interval, we solve the above linear equation. Note that the flow matrix A specifies the paths for which performance metrics can be determined. Hence, it is preferable to ensure that the columns of flow matrix A correspond to paths that are as short and as disjoint as possible. Furthermore, A is typically singular.

Network measurements may be collected by injecting synthetic traffic between the endpoints in the selected call pattern. As mentioned previously, data collection may occur at regular, user defined time intervals for a user defined duration. At each time interval $t_i$, synthetic traffic is injected between all endpoint pairs in the call pattern, in a substantially simultaneous manner. It should be understood, however, that this substantially simultaneous injection of traffic is not a requirement of the invention.

Ideally, the same call pattern and hence the same flow matrix is exercised at each time $t_i$. Let $y_i$ be the vector of end-to-end path measurements collected at time $t_i$ and $x_i$ be the vector of network segment parameters, such that $y_i=Ax_i$. Since A is the same at each time interval, to obtain x values at each iteration, only different y values need to be substituted.

As indicated previously, further details regarding exemplary implementations of the processing steps 210, 212 and 214 of FIG. 2A can be found in the above-cited U.S. Patent Application Publication No. 2005/0053009.

It should be noted that the terms "link" and "path" may each be used herein refer to a communication channel or other connection between network nodes, as in the output information 220 of FIG. 2A. A path may also be generally viewed as comprising a sequence of multiple links. For example, a given end-to-end path between a pair of the endpoints 102 in FIG. 1A may be generally viewed as comprising a sequence of multiple links. In the following description, the term "path"

will typically be used in this latter sense, that is, as a sequence of links, while a "link" will be considered a path of unity length. Therefore, in this context, a given link is considered a path, but a given path may not be considered a link. It is to be appreciated, however, that this assumption is for illustrative purposes only, and the invention does not require the applicability of these and other assumptions made herein.

The root cause analysis function of FIG. 2A assigns performance estimates to links or groups of links in the network. In the context of locating the source of performance problems, a single bottleneck link may cause performance problems on any end-to-end path traversing the link. Similarly, a number of bottlenecks can show symptoms throughout the network. The amount of effort required to locate the bottlenecks as well as their scale may be significant depending on the network topology. The FIG. 2A approach automates this task by providing a particularly efficient mechanism for understanding the link-level behavior in the network. For example, based on a user-defined threshold of acceptable performance, those links that have unacceptable levels may be identified, and then further investigated to better understand the nature of the problems. This advantageously provides an ability to accurately pinpoint the network regions with unacceptable performance levels.

An aspect of the present invention relates generally to techniques for determining an appropriate set of endpoint device locations for collecting the end-to-end performance measurements that are used in the above-described root cause analysis. The illustrative embodiment determines an appropriate set of locations for the endpoint devices that are used to inject traffic representative of a given target application such as IP telephony, and to collect end-to-end performance measurements relating to the injected traffic, so as to ensure efficient root-cause analysis that is accurate and has low cost.

Using a large number of such endpoint devices ensures a precise analysis that covers the network and pinpoints the sources of performance problems as precisely as possible but with a high cost. On the other hand, using few such devices keeps the cost low but potentially decreases the accuracy of the analysis. Hence there is a tradeoff between the cost of network instrumentation and the accuracy of analysis. The illustrative embodiment provides techniques for balancing the cost and the accuracy of analysis from a practical perspective.

Given a network topology, a coverage and a precision level, the illustrative embodiment determines how many endpoint devices are necessary to perform root-cause-analysis and where the devices should be located. Alternatively, the illustrative embodiment determines the coverage and precision level for a given predetermined placement of endpoint devices.

The disclosed techniques are also useful in cases where the network topology is not available but limited information to build a model is available. In such cases, using a network topology model, a coverage and a precision level, an estimate of the number of endpoint devices necessary to analyze the given model can be determined.

Advantageously, the disclosed techniques can minimize the number of endpoint devices needed to provide root cause analysis in a given embodiment. This not only reduces the cost of the implementation, but also limits the amount of injected traffic and its impact on the operation of the network.

In the following description, injected traffic will be referred to as probes, and devices used to inject the traffic and collect end-to-end measurement data are referred to as endpoints. It should be noted that a given endpoint may be, for example, a device that is added to a network in order to support the traffic injection and end-to-end measurement functionality, or an existing network device that is reconfigured to operate as an endpoint. Thus, an endpoint may be a separate device that is attached to an existing network device, or may comprise a network device that is already configured with endpoint functionality or reconfigured to include endpoint functionality.

Definitions and notations utilized in describing the illustrative embodiments will now be introduced. It is to be appreciated that these particular definitions and notations are presented for clarity and simplicity of description, and should not be construed as limiting the scope of the invention in any way. Alternative embodiments may therefore be implemented which do not conform to one or more of the definitions and notations given below.

The network topology is represented as a graph $G=(V,E)$ where V is the set of vertices in the network and E is the set of edges. Vertices in V may denote routers or other switching elements in the network. Edges in E may denote IP layer connectivity between the routers in the network, also referred to as Layer-3 connectivity. It is assumed that an endpoint can be attached to any vertex in the network.

An end-to-end probe tests or covers an end-to-end network path, which is referred to as a measurement path. Each edge on the network path traversed by a probe is considered covered by the probe. An edge e is considered estimable if a QoS metric on e can be computed by solving the linear equation $y=Ax$ described above. A sequence of edges is considered a pipe if the same synthetic traffic flows on every edge in the sequence. Ideally, if every edge or pipe in the network is estimable, then identifying problematic network elements is trivial. Unfortunately, it is often not possible to estimate performance on each edge or pipe, although in most cases it is possible to estimate performance on edges or short network segments. In the worst case, depending on the topology, placement of endpoints, and the end-to-end paths exercised, only the end-to-end paths may be estimable, which is equivalent to no link level inference.

For simplicity and clarity of description, the illustrative embodiments assume symmetric routing and may estimate the performance as the sum of forward and reverse directions. However, the disclosed techniques are also applicable to asymmetric routing. In the case of asymmetric routing, parts of the network subject to asymmetric routing would typically be estimable in longer directed segments.

The illustrative embodiments utilize two exemplary coverage criteria to quantify the network coverage and the quality of analysis. These are referred to herein as the links-covered (LC) criterion and the links-estimable (LE) criterion, and each will be described in greater detail below.

The LC criterion specifies the percentage of the total number of links in the network that are covered links. LC=X % requires that X % of all links in the network are covered by some end-to-end probe. Thus, in the LC criterion, the coverage level is dictated by the number of edges traversed by end-to-end probes. For instance, if all links in the network are covered by some injected end-to-end probe, then LC=100%, indicating complete coverage. If some links are not covered, the LC coverage level falls below 100%.

The LE criterion specifies the percentage of the total number of links in the network that are estimable. LE=Y % requires that Y % of all links in the network are estimable. If a link is estimable, it must necessarily also be covered. Thus, the LC value for a given network must be greater than or equal to the LE value for that network, or $X \geq Y$. In the LE criterion, the coverage level is dictated by the number of individual links for which performance can be estimated, for example, by inferring link level performance from a collection of endto-end measurements and the corresponding network routing information. We refer to such links as estimable. If all links are estimable, then LE=100%.

Note that the percent sign may be omitted following a given LC or LE value when the meaning is clear.

The endpoint placement algorithms to be described in conjunction with FIGS. 4, 5 and 6 aim to minimize the number of endpoints while satisfying a given coverage criterion. FIG. 4 shows a generic algorithm that does not require any particular type of coverage criterion, while the algorithms of FIGS. 5 and 6 represent modified versions of the FIG. 4 algorithm adapted for use with the respective LC and LE criteria described above.

The problem of determining appropriate endpoint locations may be characterized as selecting a subset of network routers to which endpoints should be attached so that a given criterion at the specified coverage level is satisfied. More formally, given G=(V, E) and a coverage criterion C, the problem may be characterized as determining a subset of V, denoted set D, such that if endpoints are attached to D then C can be satisfied. In the following description, for brevity, we assume that C denotes both the type of criterion and the coverage level.

It should again be noted that the reference to attachment of endpoints to network devices in the context of certain illustrative embodiments is by way of example only. As mentioned above, the invention does not require such attachment, and the network devices themselves can be configured to operate as endpoints in a given embodiment.

Selection of the set of probes that are injected in the network may change which links are covered and which are estimable, and hence the satisfiability of C. A simple but inefficient probing strategy is to inject probes between every pair of endpoint devices in D. If C is satisfied in this manner, then we assume that a solution exists. Techniques for reducing the set of end-to-end measurements between a fixed set of endpoints are described in B. Karacali et al., "Scalable Network Assessment for IP Telephony," in Proc. of the 2004 IEEE Intl. Conf. on Communications (ICC-04), 2004, which is incorporated by reference herein.

Figures 3A, 3B, 3C:
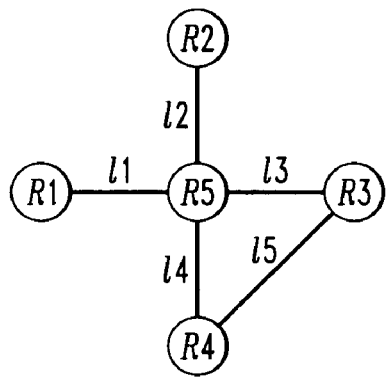
FIGS. 3A through 3C show examples of a network and associated flow matrices used in illustrating the operation of the invention.

FIG. 3A shows a simple example of a network with five routers, denoted R1 through R5, and five links, denoted l1 through l5, in one embodiment of the invention. The routes between all of the routers in the network are also shown in the figure as a matrix. It should be noted, by way of example, that l1.l2 denotes the path formed by the sequence of links l1 and l2.

First we consider the LC criterion. In this example, if we attach endpoints to routers R1 and R2 then links l1 and l2 are covered. This endpoint placement corresponds to two out of five links covered, hence LC=40. If we additionally attach endpoints to R3 and R4 then all links in the network are covered, such that LC=100. Note we do not need an endpoint on router R5.

Next we consider the LE criterion. If we add endpoints to R1, R2, and R3 then links l1, l2, and l3 will be covered. Furthermore, these three links will also be estimable, such that LE=60. If we construct a flow matrix using R1, R2, R3, and R5 and links l1, l2, and l3 as shown in FIG. 3B, this matrix will be full rank and invertible.

To make all five links estimable (LE=100), additional endpoints should be attached to R3 and R4. A resulting flow matrix, shown in FIG. 3C, is invertible, thereby ensuring that each link is estimable. Techniques for constructing such invertible matrices are described in the above-described B. Karacali et al. reference.

Ideally, all links in the network are traversed by some end-to-end probe. In this case LC=100. However, it is often not realistic nor practical to inject large amounts of probing traffic to exercise all edges. Furthermore, often coverage of a smaller percentage, e.g., 90% of the edges, is sufficient to assess the network. Similarly, for the purpose of pinpointing the source of QoS degradation, it is often not practical to estimate each edge in the network and more realistic LE figures may be adequate for assessment.

FIG. 4 shows a generic "greedy" algorithm for selecting endpoint locations such that a given criterion is satisfied. Initially the set D of routers or other network devices to which endpoints can be attached is empty. At each iteration of the algorithm, until the specified criterion C is satisfied, a new vertex v is picked from the remaining set of vertices (V\D) and added to D. The selection of v is based on its score according to a given criterion C denoted by $score_C(v)$. The score of v quantifies the impact of selecting v to the satisfaction of C. After the selection of a new vertex, the impact of the selection is reflected and the scores of the remaining devices are updated accordingly.

The generic greedy algorithm of FIG. 4 can be applied to any criterion by defining an appropriate score function and the necessary data structures to support such a computation. The algorithms to be described below in conjunction with FIGS. 5 and 6 provide examples of such arrangements for the LC and LE criteria, respectively.

FIG. 5 shows the LC algorithm, which is a modified version of the generic algorithm. R' maintains a list of paths that have uncovered edges. Initially, R'=R, where R denotes the set of all routes in the network. At each iteration of the LC algorithm, as new endpoints are selected, new edges are covered. As a result, any route whose edges are all covered is removed from R'.

The score function of a vertex for LC is defined as follows. At any given step of the algorithm, edges on the paths between the vertices in D are covered. Selecting a new vertex v at this point covers additional paths between the new vertex v and vertices in D. The number of additional edges that will be covered if v is selected is an accurate quantification of v's score. Hence we define $score_{LC}(v)$ as the number of uncovered edges on the paths between v and vertices in D.

FIG. 6 shows the LE algorithm, which is also a modified version of the generic algorithm. The subtle relationship between the network topology and the estimable paths complicates the task of defining an appropriate score function for the LE criterion. In efforts to quantify the impact of endpoint locations on estimable paths, we developed a heuristic approach based on the observation that when the topology graph is a tree, i.e., when there is exactly one path between every pair of nodes, every pipe on the tree is estimable. In this case, optimum placement of endpoints to estimate each pipe is also trivial, i.e., attach an endpoint to every node whose degree is $\leq 2$. In other words, endpoints are attached to every leaf node and to every internal node on a pipe.

In many practical networks, the network topology graph is often not a tree but close to being a tree, reflecting engineered routing. Accordingly, in the illustrative embodiments we represent the topology graph as a collection of trees, i.e., a forest. In this case, an appropriate heuristic for attachment of endpoints initially attaches an endpoint to every leaf node on every tree in the forest. Then the set of pipes using these endpoints is computed and an endpoint is attached to the distinct internal nodes on the pipes. Using this heuristic, the endpoints should be attached to network devices by starting with the leaf nodes and moving to internal nodes on a pipe. Note that nodes with high degrees ($\geq 2$) should be the last to attach an endpoint.

The score function that reflects this observation is denoted $score_{LE}(v)$. The rank of v among other nodes is sorted first by the number of trees v appears on and then by the degree of v.

The LE algorithm as shown in FIG. 6 utilizes the score function described above. The algorithm starts by creating a forest using the routing information R. The forest structure F is a set of trees T where the path between every pair of nodes in the network is represented in at least one tree in the forest. During forest creation, each one of the $(|V|)(|V|-1)$ end-to-end paths in the network, i.e., the paths in R, is considered. The first path becomes a tree by itself representing all nodes and edges traversed by the path. If a new end-to-end path can be added to an existing tree in the forest without creating a cycle, then it is added as such. Otherwise, it becomes a tree by itself. When the last end-to-end path is processed, the remaining trees form the forest structure F. Those skilled in the art will recognize that this high level forest creation algorithm can be modified in a straightforward manner to provide improved efficiency.

At each iteration of the LE algorithm of FIG. 6, a new vertex v with the highest score is selected from the remaining set of vertices V\D. After a new vertex is selected, the forest representation F is updated to ensure that all vertices selected as endpoints are leaf nodes in the forest. Any tree that includes the newly selected vertex v as a non-leaf node needs to be updated by breaking that tree at vertex v.

This greedy approach also has some practical benefits. For instance, in most cases engineers place endpoints in convenient places and require automated support to select the next best place to put an endpoint. Hence a greedy scoring algorithm can also support manual endpoint placement by guiding the selection of the next best alternative.

The LE criterion imposes additional constraints on top of LC coverage since it applies to the parts of the network that are already covered by the probes. Covered parts of the network should be identified by the LC algorithm before the LE algorithm is applied. Recall that an estimable link must be covered but a covered link is not necessarily estimable. Hence it is possible to apply the LE criterion to different levels of LC coverage. For example, results for LE=50 for LC=100 and LC=90 would typically be different.

Simulation results indicate that the heuristic LC and LE algorithms of FIGS. 5 and 6 have performance which is comparable to that of corresponding optimum algorithms. The optimum algorithms consider all possible subsets of V as potential sets of endpoints and select the smallest such subset that satisfies a specified criterion. As a result, the optimum algorithms are computationally intensive and consume significant amounts of resources especially on large network topologies. The heuristic LC and LE algorithms avoid this computational complexity and yet provide efficient and accurate solutions to the endpoint location problem.

It is readily apparent that the LC coverage level increases with the number of links covered by the probes. The relationship between the probes and the LE coverage, however, is not as clear since what makes a link estimable is not as well defined. Recall that the overall goal of the LE criterion is to ensure that the shortest possible network paths, ideally links, are estimable. Hence as the average length of estimable paths in the network decreases, LE coverage increases and the accuracy of the analysis increases. It has been determined that LE coverage levels of about 40-50% are sufficient to ensure estimable paths with lengths that are consistent with efficient root cause analysis. Note that our goal in the illustrative embodiments is to select the smallest LE coverage level that would result in good analysis while keeping the number of endpoints small. An LE coverage level of approximately 40% would therefore be appropriate, although other values can of course be used.

As noted above, it is also possible to predict the number of endpoints necessary to cover a network in the absence of network topology. In the absence of network topology we assume that some minimal information is available about the network. Such information may include, for example, the size of the network measured in terms of the number of routers in the network. The algorithms described above can be used to predict the number of endpoints necessary to satisfy a specified criterion using the number of routers in the network. For example, it was observed in simulations of the above LC and LE algorithms that the number of endpoints placed in the network to satisfy a given coverage criterion increased linearly with increasing network size. Thus, the number of endpoints can be predicted as a function of the number of routers using linear regression.

This is accomplished in an illustrative embodiment by performing a linear regression using median numbers of endpoints computed for various simulation configurations. The regression results are used in conjunction with information regarding network size in terms of number of routers to determine the predicted number of endpoints for the network. Increased accuracy may be obtained by separating networks of small size ($\leq 50$ nodes) from larger ones (>50 nodes) and performing separate regressions for the small and large networks. Generally, the slopes of the regression lines for the small networks are larger than those of the large networks.

A monitoring and analysis system with a root cause analysis function and endpoint placement determined in accordance with the invention can be implemented as part of or in conjunction with an otherwise conventional VoIP analysis tool or other network management system application that is used, for example, to test, diagnose, troubleshoot or design an Internet telephony system or other type of network-based communication system. An example of a network management system application is the VMON® system from Avaya Inc. of Basking Ridge, N.J., USA.

As previously noted, one or more of the monitoring and analysis functions described above in conjunction with the illustrative embodiments of the invention may be implemented in whole or in part in software utilizing processor 202 and memory 204 associated with a controller or an endpoint device. Other suitable arrangements of hardware, firmware or software may be used to implement the techniques of the invention.

It should again be emphasized that the above-described arrangements are illustrative only. For example, alternative embodiments may utilize different endpoint device hardware, firmware or software configurations, different formats for synthesized calls, different types of network traffic, and different communication protocols than those of the illustrative embodiments. As mentioned previously, the disclosed techniques are not limited to IP or layer-3 connectivity, but can be adapted in a straightforward manner for use with other types of network connectivity such as, for example, layer-2 connectivity. In addition, although test communications between a selected pair of endpoints are described in conjunction with the above examples, other arrangements are possible, such as communications with a single endpoint, communications between a given originating endpoint and multiple destination endpoints, etc. Also, the particular processing steps associated with the algorithms in the illustrative embodiments may be varied. Furthermore, the particular assumptions used in the context of describing the illustrative embodiments should not be viewed as requirements of the invention, and embodiments may be constructed in which one or more of these assumptions do not apply. These and numerous other alternative embodiments within the scope of the following claims will be apparent to those skilled in the art.

What is claimed is:

1. A method comprising:

selecting at least two endpoint devices for use in performance analysis;

generating test communications between a pair of the selected endpoint devices;

collecting end-to-end path measurement data utilizing the generated test communications; and transforming the end-to-end path measurement data to produce a plurality of performance indicators;

wherein the selection of the endpoint devices is based on the impact of the transmission of test communications along a path between the pair of endpoint devices on the achievement of a coverage criterion; and wherein the coverage criterion comprises a links-covered criterion which specifies a percentage of a total number of links of the network that are covered by the test communications.

2. The method of claim 1 wherein at least one of the endpoint devices comprises a network device configured to have test communication generation capability.

3. The method of claim 1 wherein at least one of the endpoint devices comprises a device that is coupled to a network device that does not have test communication generation capability.

4. The method of claim 1 wherein the endpoint devices are selected based on an algorithm which characterizes the network as a graph having edges and vertices, and treats the endpoint devices as vertices on the graph, wherein the vertices correspond to switching elements of the network and the edges correspond to connectivity between the switching elements of the network.

5. The method of claim 1 wherein the coverage criterion comprises a links-estimable criterion which specifies a percentage of a total number of links of the network for which performance is estimable from the end-to-end path measurement data.

6. The method of claim 1 wherein the endpoint devices are selected based on an algorithm which characterizes the network as a graph having edges and vertices, and treats the endpoint devices as vertices on the graph, and wherein the algorithm at a given iteration selects one or more of the vertices for association with one or more respective endpoint devices based on scores computed for the vertices, wherein after selection of the one or more vertices in the given iteration scores of the remaining vertices are recomputed for use in a subsequent iteration.

7. The method of claim 6 wherein the endpoint devices are selected based on an algorithm which characterizes the network as a graph having edges and vertices, and treats the endpoint devices as vertices on the graph, and wherein the score computed for a given one of the vertices is given by a number of uncovered edges on paths between the given vertex and vertices already selected for association with respective endpoint devices.

8. The method of claim 1 wherein the endpoint devices are selected based on an algorithm which characterizes the network as a graph having edges and vertices, and treats the endpoint devices as vertices on the graph, and wherein the graph comprises a plurality of trees defined by the edges and vertices, and wherein the leaf nodes of the trees are associated with respective ones of the endpoint devices.

9. The method of claim 6 wherein the endpoint devices are selected based on an algorithm which characterizes the network as a graph having edges and vertices, and treats the endpoint devices as vertices on the graph, and wherein the score computed for a given one of the vertices is given by a rank of the given vertex after sorting unselected vertices based on a number of trees in which the vertices appear and degree of the vertices.

10. The method of claim 6 wherein the endpoint devices are selected based on an algorithm which characterizes the network as a graph having edges and vertices, and treats the endpoint devices as vertices on the graph, and wherein if a selected one of the vertices comprises a non-leaf node of a tree of the graph, the tree is broken at the selected vertex into a number of separate trees.

11. The method of claim 1 wherein a given one of the test communications is directed between a first one of the endpoint devices and a second one of the endpoint devices.

12. The method of claim 1 further comprising repeating the generating, collecting and transforming steps for each of a plurality of time intervals.

13. The method of claim 1 wherein at least one of the performance indicators comprises a binary indicator, the binary indicator taking on a first value to indicate that a corresponding link is not associated with a performance problem, and taking on a second value to indicate that the corresponding link is associated with a performance problem.

14. A method comprising:

selecting at least two endpoint devices for use in performance analysis;

generating test communications between a pair of the selected endpoint devices;

collecting end-to-end path measurement data utilizing the generated test communications; and transforming the end-to-end path measurement data to produce a plurality of performance indicators;

wherein the selection of the endpoint devices is based on the impact of the transmission of test communications along a path between the pair of endpoint devices on the achievement of a coverage criterion; and wherein for a given time interval the collected end-to-end path measurement data is characterized by the equation:

$$Y = Ax$$

where y is a vector of end-to-end path measurements, A is a flow matrix defining a selected pattern, and x is a vector of network link-level performance indicators.

15. The method of claim 14 wherein the transforming step comprises utilizing y and A to solve the equation for x.

* * * * *